(12) United States Patent
Hosini et al.

(10) Patent No.: US 8,314,602 B2
(45) Date of Patent: Nov. 20, 2012

(54) CONVERTER CELL MODULE, VOLTAGE SOURCE CONVERTER SYSTEM COMPRISING SUCH A MODULE AND A METHOD FOR CONTROLLING SUCH A SYSTEM

(75) Inventors: Falah Hosini, Vasteras (SE); Jan R. Svensson, Vasteras (SE); Jean-Philippe Hasler, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/407,425

(22) Filed: Feb. 28, 2012

(65) Prior Publication Data
US 2012/0155130 A1    Jun. 21, 2012

Related U.S. Application Data

(63) Continuation of application No. PCT/EP2009/061155, filed on Aug. 28, 2009.

(51) Int. Cl.
*H01F 17/00* (2006.01)
*H02M 7/10* (2006.01)
(52) U.S. Cl. .......................... 323/363; 363/68
(58) Field of Classification Search .......... 363/65, 363/68, 153, 154; 323/355, 363
See application file for complete search history.

(56) References Cited

U.S. PATENT DOCUMENTS

| | | | | |
|---|---|---|---|---|
| 4,356,433 | A | * | 10/1982 | Linden ............ 315/308 |
| 6,111,768 | A | * | 8/2000 | Curtiss ............ 363/98 |
| 6,236,580 | B1 | | 5/2001 | Aiello et al. |
| 7,375,996 | B2 | * | 5/2008 | Singh et al. ......... 363/149 |

OTHER PUBLICATIONS

Dong-Myung Lee et al. "A voltage sag supporter utilizing a PMW-switched autotransformer" Power Electronics Specialists Conference, 2004, Pesc Apr. 2004 IEEE 35th annual, Aachen, Germany Jun. 20-25, 2004, Piscataway, JN, USA, IEEE, US vol. 6, Jun. 20, 2004, pp. 4244-4250.
International Preliminary Report on Patentability; Application No. PCT/EP2009/061155; Oct. 4, 2011; 21 pages.
International Search Report and Written Opinion of the International Searching Authority; Application No. PCT/EP2009/061155; Dec. 1, 2010; 13 pages.
Anonymous; "Series 300TM UPS Three Phase 10 kVA to 125 kVA; 60Hz Installation, Operation & Maintenance Manual" Liebert Power Protection, Jul. 31, 1997; XP002610374; Retrieved from the Internet: URL: http://www.makopower.com/pdfs/pdfs/power-protection-equipment/ups/liebert/Series%20300%20installation%20manual.pdf [retrieved on Nov. 18, 2010] p. 20; figure 1.

* cited by examiner

*Primary Examiner* — Matthew Nguyen
(74) *Attorney, Agent, or Firm* — St. Onge Steward Johnston & Reens LLC

(57) ABSTRACT

A converter cell module and a voltage source converter system. The converter cell module includes at least two switching elements, means for energy storage and an autotransformer. The autotransformer is arranged to bypass the converter cell module in the case of failure occurring in the converter cell module.

9 Claims, 2 Drawing Sheets

_US 8,314,602 B2_

CONVERTER CELL MODULE, VOLTAGE SOURCE CONVERTER SYSTEM COMPRISING SUCH A MODULE AND A METHOD FOR CONTROLLING SUCH A SYSTEM

CROSS-REFERENCE TO RELATED APPLICATIONS

The present application is a continuation of pending International patent application PCT/EP2009/061155 filed on Aug. 28, 2009, the content of which is incorporated herein by reference.

FIELD OF THE INVENTION

The invention relates to a converter cell module and a voltage source converter system comprising such a module. The converter cell module according to the invention comprises at least two switching elements, means for energy storage and an autotransformer. The autotransformer is arranged to bypass the converter cell module in the case of failure occurring in the converter cell module. The invention further relates to a method for controlling such a system.

BACKGROUND OF THE INVENTION

Chain-link Multi-level Voltage source converter systems comprise a number of converter cell modules connected in series. Each converter cell module forms one "link" (or cell) of a single phase voltage source converter (VSC) and is switched on/off a number of times during a fundamental frequency cycle of an ac system. The chain-link converter may comprise a number of phases, each phase comprising a chain of such converter cell modules connected in series to each other.

Briefly, the converter cell typically comprises semiconductor assemblies of turn-off type, e.g. insulated gate bipolar transistors (IGBTs). As an example a converter cell module comprises four IGBTs. A free-wheeling diode, also denoted anti-parallel diode, is connected in parallel with each IGBT and conducts in the opposite direction of the IGBT. The IGBTs are connected in an H-bridge arrangement with a DC link capacitor bank.

The number of converter cell modules connected in series for each phase is proportional to the AC voltage rating of the ac system. The number of converter cell modules can therefore be large for high voltage applications having no mains transformers, which entails high costs. Further, the current demands on the converter cell modules may also be low in high voltage systems, resulting in the use of overrated semiconductor components, which again entails high costs.

On the other hand, if the application at hand requires higher currents than available in semiconductor ratings, converter cells or semiconductor switches have to be parallel connected, thus yet again resulting in high costs.

In order to provide flexibility in these types of applications, the use of transformers is a solution. However, the cost of a mains transformer is high and a mains transformer requires a large footprint, not available for all types of applications.

It is necessary that the series connected cells have a feature that allows the cell to be bypassed in case of a failure in the cell in order to enable continuous operation of the converter system without tripping if for example a semiconductor device fails. That is, if the semiconductor device, e.g. the IGBT, is damaged the cell cannot be allowed to go into an open circuit, as the series-connection of converter cell modules then would form an open circuit. There are semiconductor devices available that go into short circuit when damaged, e.g. press-pack IGBTs, which if broken become a short-circuit, a behaviour that is known as short-circuit failure mode (SCFM). However, the cost of such semiconductor devices is very high, even as large as twice the cost of standard industrial type of devices.

The use of standard industrial type of devices requires the use of additional components such as very fast bypass switches that bypass a faulty cell or device. This, yet again, entails high costs.

U.S. Pat. No. 6,236,580 discloses a modular multilevel adjustable supply with series connected active inputs.

The publication "Series 300TM UPS Three Phase 10 kVA to 125 kVA; 60 Hz—Installation, Operation & Maintenance Manual" by Lieber Power Protection discloses a computer protection system comprising a back-to-back AC converter which can be bypassed by a switch for maintenance purposes.

"A voltage sag supporter utilizing a PMW-switched autotransformer", Power Electronics Specialists Conference, 2004, Pesc 04.2004 IEEE 35th annual, Aachen, Germany 20-25 Jun. 2004, Piscataway, JN, USA, IEEE, US vol. 6, 20 Jun. 2004, pp 4244-4250, by Dong-Myung Lee et al. discloses a distribution-level voltage control scheme that can compensate voltage sag and swell conditions in three-phase power systems. Voltage sag support is based on a Pulse Width Modulated (PWM) autotransformer.

SUMMARY OF THE INVENTION

In view of the above, it is an object of the present invention to provide an improved topology, and in particular a converter cell module and a converter system, having a reduced cost compared to known solutions.

This object, among others, are achieved by a converter cell module, a system comprising such a converter cell module and a method for controlling such a system.

In accordance with the present invention there is provided a converter cell module for a voltage source converter system, which converter cell module comprises at least two switching elements, means for energy storage, an autotransformer and a first and second terminal, wherein said autotransformer has a first end terminal, an intermediate terminal, and a second end terminal, wherein the first and the second terminal are connected to the intermediate terminal and the second end terminal, respectively, wherein the second end terminal of the autotransformer is an output terminal of the converter cell module connectable to another converter cell module, and wherein the first end terminal of the autotransformer is an input terminal of the converter cell module, whereby the autotransformer bypasses said converter cell module in the case of failure occurring in the converter cell module. By such an arrangement the failed module is bypassed by the autotransformer, in the case of any failure in the converter cell module, thereby not causing any operational stop when used in a voltage source converter system.

In another embodiment said at least two switching elements are connected in parallel and each having at least two semiconductor assemblies being of turn off type connected in series, and each being connected in anti-parallel with a rectifying element, and wherein said means for energy storage is connected in parallel with said switching elements.

In yet another embodiment comprises each of the semiconductor assemblies an insulated gate bipolar transistor (IGBT).

In yet another embodiment the autotransformer is arranged to provide an inductance to the converter cell module.

In yet another embodiment the converter cell module comprises further means for disconnecting the module. Thereby can the converter cell module be electrically disconnected from any other electrical equipment when used in an electrical system.

In another aspect of the present invention is a voltage source converter system provided. The system comprises one or more phases, each of said phases comprising at least two converter cell modules. Bypassing the converter cell modules in the case of failure is performed during continuous operation of said system.

In another embodiment comprises the system three phases (L1, L2, L3).

In yet another embodiment are the three phases (L1, L2, L3) connected in a delta configuration.

Alternatively can the three phases (L1, L2, L3) be connected in a Y configuration.

In another aspect of the present invention is a method for controlling a voltage source converter system. The system comprises one or more phases, each of the phases comprising at least two converter cell modules. The method comprises bypassing the converter cell module or modules in which failure has occurred. By such an arrangement, for example in the case of failure in any of a plurality of converter cell modules being connected in series to each other, all of the failed modules are directly and automatically bypassed by the autotransformer and the current will flow directly to the next, non-defect converter cell module. Continuous operation of the converter system without any operational break is provided even if several modules fail provided of course that some redundant cells are available.

Further features and advantages thereof will become clear upon reading the following detailed description together with the appended drawings.

DETAILED DESCRIPTION OF THE INVENTION

Figure 1:
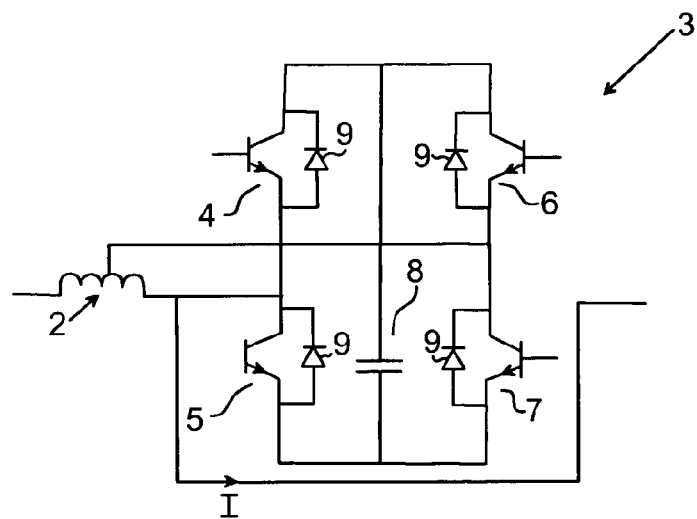
FIG. 1 illustrates a converter cell module in accordance with the present invention.

FIG. 1 illustrates a converter cell module 3 comprising four IGBT:s (4, 5, 6, 7) connected in a H-bridge configuration where each semiconductor assembly has a rectifying element 9 connected in antiparallel. The converter cell module 3 also comprises a capacitor 8. As seen in the figure, an autotransformer 2 is connected such that the converter cell module will be bypassed automatically in the case of failure in the module. In the case of failure in any of the IGBT's, current I will flow as indicated thereby bypassing the module 3.

Figure 2:
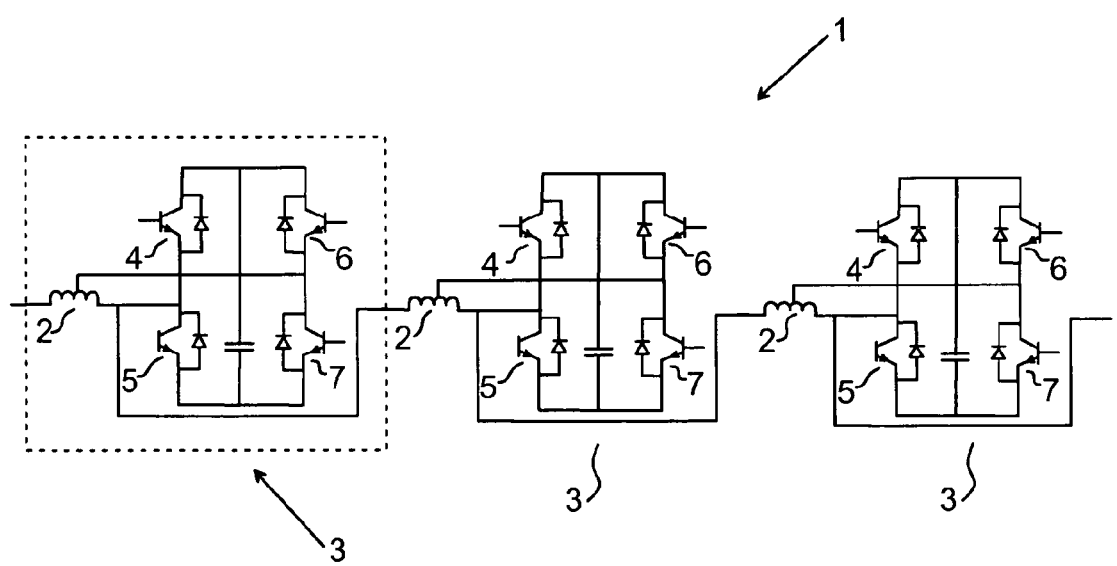
FIG. 2 illustrates a voltage source converter system in accordance with the present invention.

FIG. 2 illustrates a voltage source converter system 1. A plurality of converter cell modules 3 are connected in series. If a failure occurs in one, or several of the converter cell modules 3, that module, or each of those modules, is/are bypassed by the connection of the autotransformer(s) 2. After bypassing the defect module, or modules, the defect module (-s) may be disconnected from the rest of the converter system by disconnecting means (not shown). Each of the modules 3 are provided with separate disconnectors to allow disconnecting of a single module. Due to the bypassing function provided by the autotransformers 2, no current flows in the defect module (-s) and a cheap and robust standard disconnector may be used.

Figure 3:
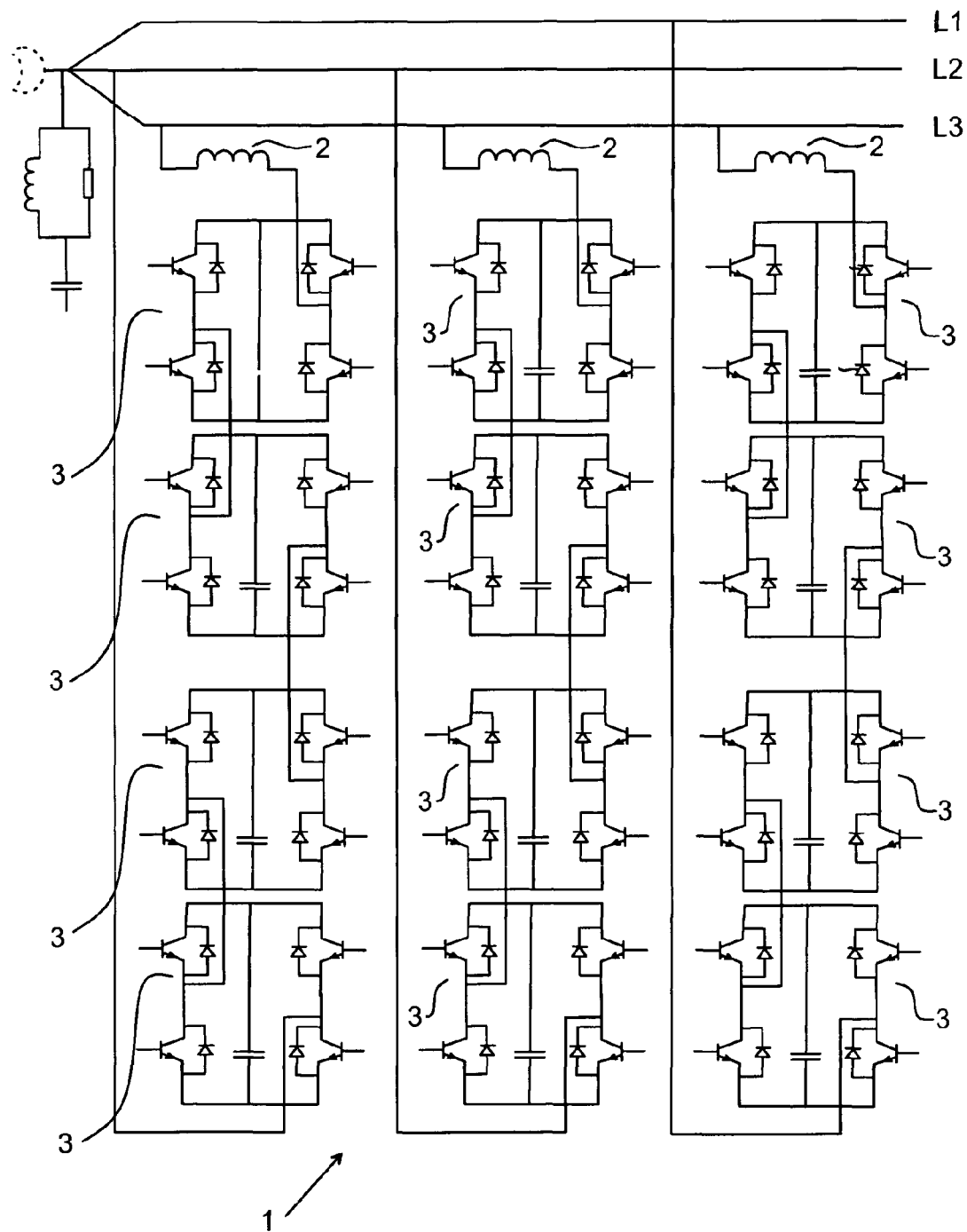
FIG. 3 illustrates the system arranged in a delta connected arrangement.

FIG. 3 illustrates a three phase converter system 1 arranged in a delta connected arrangement. For each phase, a plurality of converter cell modules 3 are connected in series to each other. The number of series connected modules 3 depends on the voltage level of the converter system. The system may also be connected in a Y configuration.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A single phase converter cell module for a voltage source converter system, which converter cell module comprises two switching elements, a capacitor and an autotransformer, wherein the switching elements comprise insulated gate bipolar transistors connected in an H-bridge configuration having a first and a second terminal, characterized in that the autotransformer has a first end terminal, an intermediate terminal, and a second end terminal, wherein the first and the second terminal of the H-bridge configuration are connected to the intermediate terminal and the second end terminal, respectively, wherein the second end terminal of the autotransformer is an output terminal of the converter cell module connectable to another converter cell module, and wherein the first end terminal of the autotransformer is an input terminal of the converter cell module, whereby the autotransformer bypasses said converter cell module in the case of failure occurring in the converter cell module.

2. The converter cell module according to claim 1 wherein said at least two switching elements are connected in parallel and each having two insulated gate bipolar transistors connected in series, and each insulated gate bipolar transistor being connected in anti-parallel with a rectifying element, and wherein capacitor is connected in parallel with said switching elements.

3. The converter cell module according to claim 1, wherein said autotransformer is arranged to provide an inductance to the converter cell module.

4. The converter cell module according to claim 1, further comprising means for electrically disconnecting the said converter cell module.

5. A voltage source converter system comprising one or more phases, each of said phases comprising at least two converter cell modules in accordance with claim 1 connected in series to each other, wherein the converter cell modules in the case of failure are arranged to be bypassed during continuous operation of said system.

6. The converter system according to claim 5, wherein said system comprises three phases.

7. The converter system according to claim 6, wherein said three phases are connected in a delta configuration.

8. The converter system according to claim 6, wherein said three phases are connected in a Y configuration.

9. A method for controlling a voltage source converter system:
said system comprising one or more phases, each of said phases comprising at least two converter cell modules connected in series to each other,
said at least two converter cell modules each comprising two switching elements, a capacitor and an autotransformer, wherein the switching elements comprise insulated pate bipolar transistors connected in an H-bridge configuration having a first and a second terminal, characterized in that the autotransformer has a first end terminal, an intermediate terminal, and a second end terminal, wherein the first and the second terminal of the H-bridge configuration are connected to the intermediate terminal and the second end terminal, respectively, wherein the second end terminal of the autotransformer is an output terminal of the converter cell module connectable to another converter cell module, and wherein the first end terminal of the autotransformer is an input terminal of the converter cell module, whereby the autotransformer bypasses said converter cell module in the case of failure occurring in the converter cell module, wherein the converter cell modules in the case of failure are arranged to be bypassed during continuous operation of said system, said method comprising the step of:

bypassing a converter cell module or modules if a failure occurs in the said converter cell module or modules.

* * * * *